April 30, 1957 — J. R. WALD, JR — 2,790,410
HIGHWAY MARKING GUARD
Filed March 8, 1955 — 2 Sheets-Sheet 1
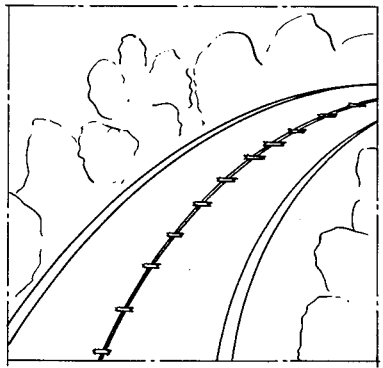
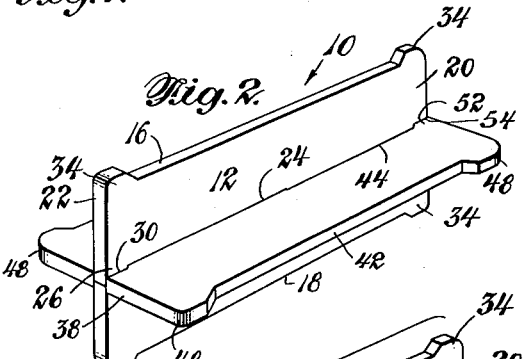
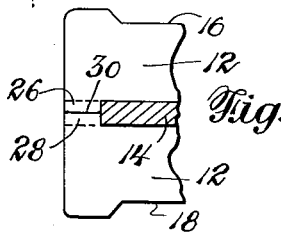
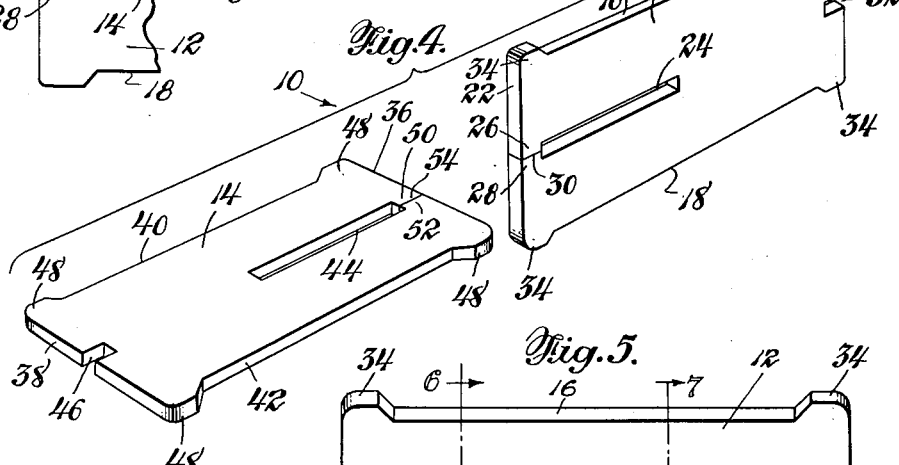
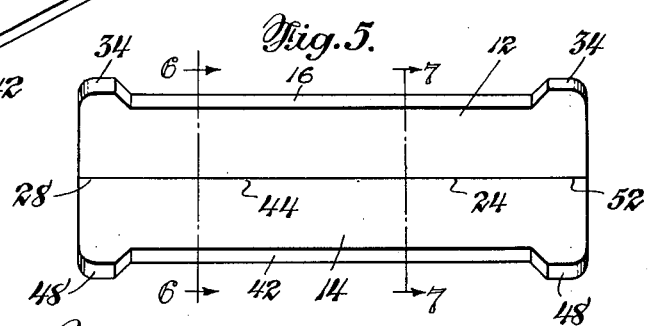
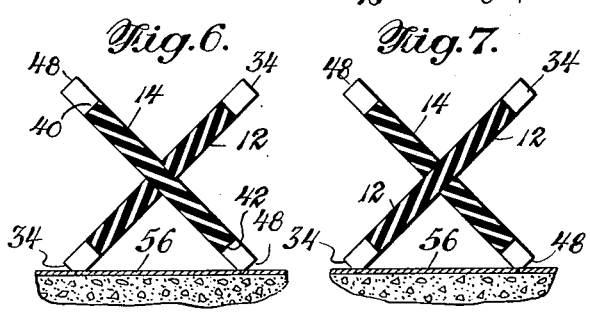
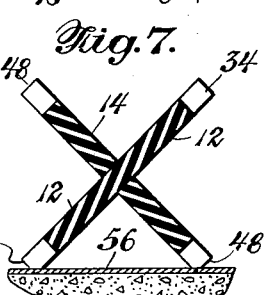
INVENTOR
John R. Wald, Jr.
BY Karl W. Flocks
ATTORNEY

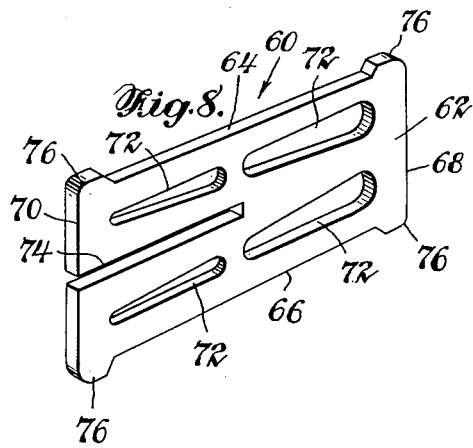
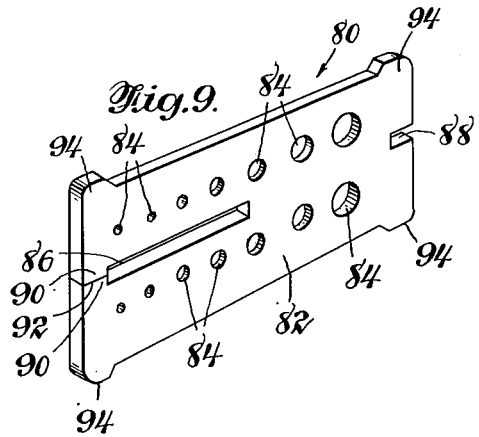
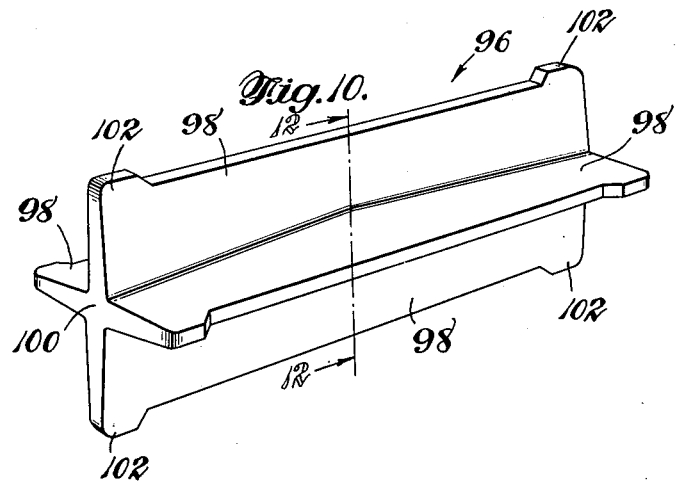
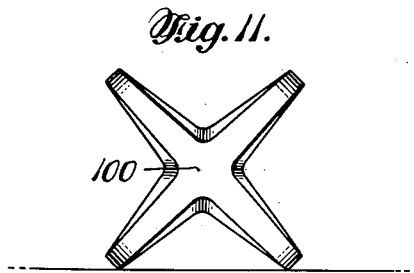

United States Patent Office 2,790,410
Patented Apr. 30, 1957

2,790,410

HIGHWAY MARKING GUARD

John R. Wald, Jr., Montoursville, Pa., assignor to Wald Industries, Inc., Huntingdon, Pa., a corporation of Pennsylvania Application March 8, 1955, Serial No. 492,995

6 Claims. (Cl. 116—63)

The present invention relates to a guard for use in protecting markings on highways and the like. More particularly, the present invention relates to a highway marking guard which is formed of a flexible material and has a configuration such that it may be easily placed over the highway marking.

After a marking, and particularly lane line strips, has been newly painted on a road or highway, it is the practice to protect the freshly applied paint with a guard of some kind. Prior to the instant invention, guards of varying sizes and shapes have been employed and have included bricks, wooden blocks and various types of irregularly shaped bodies. If the newly painted line were continuous, then a brick or block or a guard having a solid surface was objectionable since the guard had to be placed either in the traffic lane in the way of oncoming traffic or over the freshly applied line. These brick or block-type guards were also objectionable since, if they were struck by an oncoming vehicle, injury could result not only to the vehicle but to the operator of the vehicle. Various guards have been developed in recent years which utilized small feet that were adapted to elevate the guard above the line and thus protect the freshly applied line. However, these latter guards were objectionable since they were difficult to manufacture, were costly and, moreover, could not be simply and quickly applied over the highway stripe, that is to say, these latter type guards had to be carefully placed in position over the freshly applied line strip or marking thereby making the guard placing operation a tedious one.

It is therefore an object of the present invention to provide a guard for highway markings which may be easily and quickly placed over a freshly applied marking, will not obstruct traffic, and may be easily observed by the operators of the oncoming vehicles.

Another object of the present invention is to provide a highway marking that may be simply and economically manufactured and that is resistant to wear and weather.

Still another object of the present invention is to provide a traffic guard for highway markings that is formed of a resilient or flexible material but has the appearance of a metal material, thereby not only protecting a freshly applied highway marking but warning motorists to avoid striking the guard.

Still another object of the present invention is to provide a guard for highway markings that is formed of longitudinally extending sections, the sections intersecting at right angles to define an X-configuration, as seen in cross-section.

Still another object of the present invention is to provide a guard for highway markings which includes longitudinally extending sections that are provided with foot portions, the foot portions being adapted to elevate the edges of the longitudinally extending sections out of contact with the road or highway marking.

Still another object of the present invention is to provide a guard for a highway marking that may be readily assembled being rigid in the assembled position and being capable of being easily disassembled for shipping in a compact space.

Still another object of the present invention is to provide a guard for a highway marking that is adapted to be wind resistant, thereby preventing the guard from being dislodged from its position over the highway marking due to fast moving traffic.

Still another object of the present invention is to provide a guard for highway markings that may be molded in a one-piece construction.

Other objects and the nature and advantages of the instant invention will be apparent from the following description taken in conjunction with the accompanying drawings, wherein:

Fig. 1 is a perspective view of a road or highway illustrating the manner in which marking guards embodied in the present invention are employed, the guards as shown being positioned over a freshly applied paint stripe or center line road marking;

Fig. 2 is a perspective view of one form of the highway marking guard embodied in the present invention;

Fig. 3 is a sectional view showing a portion of the highway marking guard illustrated in Fig. 2;

Fig. 4 is an exploded perspective view of the highway marking guard referred to in Fig. 2;

Fig. 5 is an elevational view of the highway marking guard shown in Figs. 2, 3 and 4;

Fig. 6 is a sectional view taken along the line 6—6 of Fig. 5;

Fig. 7 is a sectional view taken along the line 7—7 of Fig. 5;

Fig. 8 is a perspective view of one section of a modified form of the highway marking guard;

Fig. 9 is a perspective view of one section of a further modified form of the highway marking guard;

Fig. 10 is a perspective view of a one-piece molded highway marking guard embodied in the present invention;

Fig. 11 is an end elevational view of the highway marking guard shown in Fig. 10; and Fig. 12 is a sectional view taken along the line 12—12 of Fig. 10.

Referring now to the drawings, and particularly to Fig. 1, a series of the highway marking guards embodied in the present invention are shown positioned over a freshly applied center line marking, thereby defining guard means for protecting the freshly applied center line against oncoming traffic. It is seen that when the highway guards are positioned over the freshly applied center line marking the guard sections straddle the marking, the longitudinal axes of the sections being substantially perpendicular to the center line marking.

Referring now to Figs. 2–7, one form of the traffic guard embodied herein is illustrated and is generally indicated at 10, the guard 10 including a pair of identically formed sections 12 and 14. The section 12 will now be described, it being understood that the section 14 is formed in a similar manner. The section 12 comprises a substantially flat rectangular member defined by longitudinal edges 16 and 18 and lateral edges 20 and 22. Formed in the body of the section 12 adjacent the lateral edge 22 is a longitudinally extending slot 24 that is adapted to slidably engage the body of the section 14. The slot 24 is closed at the end thereof adjacent the lateral edge 22 by coacting tongue portions 26 and 28, the meeting line of the tongues 26, 28 being defined by the slit line 30. The tongues 26, 28 are adapted to be deformed at the slit line 30 to enable the body of the section 14 to slide in the slot 24 as will hereinafter be described. Formed in the lateral edge 20 is a groove 32 that corresponds in size to the tongues 26, 30 and is adapted to receive the tongues of the section 14 in locking relation therewith. Formed on the extreme ends of the edges 16 and 18 are foot portions 34 which are adapted to elevate the edges 16, 18 from contact with a road surface when the guard 10 is placed thereon, thereby protecting a paint line newly applied to the surface. As shown, the section 14 is formed similarly to section 12 and includes lateral edges 36, 38, longitudinal edges 40, 42, a longitudinally extending slot 44, a groove 46 and foot portions 48. Coacting tongues 50 and 52 meet along a slit line 54 and define locking members for cooperating with the groove 32 formed in the section 16.

In assembling the sections 12, 14 of the guard 10, either the tongues 26, 30 or 50, 52 in the sections 12 and 14, respectively, are twisted to allow the opposite section to be slidably engaged. Thus slot 24 will engage the body of the section 14 and slot 44 will engage the body of the section 12. As shown in Figs. 3 and 5 when the sections are interlocked in position, the groove 32 receives the tongues 52, 54 in locking engagement therewith and similarly the groove 46 receives the tongues 50, 52 in locking engagement therewith. The sections 12 and 14 are thus firmly locked in position by means of the groove and slot arrangement, each section being positioned such that the face thereof is perpendicular to the face of the adjacent section. As shown more clearly in Figs. 6 and 7 the sections, when locked together, form an X-configuration, as seen in cross-section.

Referring again to Figs. 6 and 7, the guard 10 is shown positioned over a newly applied road stripe 56, the longitudinal edges of the sections 12, 14 between the foot portions 34 and 48 extending over the stripe 56. Thus, the foot portions of the sections 12, 14 straddle the stripe 56 and blemishing or marring of the newly applied paint is prevented. It is seen that since both longitudinal edges of each section 12 and 14 are identically formed, the guard 10 is provided with four similar edges, each edge formed with outwardly projecting foot portions. Therefore, when the guard 10 is to be placed in position over a freshly applied paint line or stripe, it is not necessary that any particular edge extend over the line or stripe and the guard may be quickly and easily placed in position. As long as two of the longitudinal edges of the guard extend over the paint line, the guard or marker is in position and serves as a guard therefor. The guard 10 may be painted red to simulate a brick or a metal and thus gives the appearance to the motorist as being a heavy object that should be avoided. Since the guard is formed of a resilient material, such as a rubber or plastic, it will resist wear due to weather and will furthermore resist wear due to impact by vehicles.

If it is desired to ship the road guard from the manufacturer to the user, the sections 12 and 14 may be placed in face-to-face relation and thus form a compact unit. It is seen that many guards may be shipped in this position and consequently require little shipping space. When it is desired to assemble the guards for use on a highway or the like, it is only necessary to engage the sections 12 and 14 by means of the interlocking slots 24 and 44, the grooves 32 and 46 cooperating with the opposite tongues to firmly lock the sections together.

Referring now to Fig. 8, a modified form of the road guard is illustrated and is indicated generally at 60. The guard 60 includes a section 62 and although only one section is shown in Fig. 8 it is understood that a similarly formed section is adapted to be engaged therewith to form a guard having a cross section. The section 62 is formed relatively thin and has a generally rectangular configuration defined by the longitudinal edges 64, 66 and lateral edges 68, 70. In order to resist air currents resulting from passing vehicles, the section 62 has a plurality of longitudinally extending openings 72 formed therein. The openings 72 not only act to allow the wind currents to be directed through the section 62, thus relieving any pressure that would normally tend to cause the road guard 60 to shift in position, but further decreases the weight of the road guard 60. The section 62 is also formed with a longitudinally extending open end slot 74 that is adapted to slidably engage the body of the corresponding section to firmly lock the sections in position. Foot portions 76 are formed on the extreme edges of the longitudinal edges 64, 66 and are adapted to engage the surface of the road on which the guard is placed, thereby elevating the longitudinal edges 64, 66 therefrom when the guard 60 is placed over a freshly applied road stripe.

In the form of the invention shown in Fig. 8, a locking groove is not formed in the lateral edge 68. However in order to securely lock the section 62 to the corresponding section an adhesive material is applied to the slot 74, the adhesive material acting to bond the section 62 to the corresponding section, a rigid and stable structure thereby being formed.

As described above in connection with the road marking guard shown in Figs. 1–7 the section 62 and the corresponding section (not shown) are adapted to interlock so that the faces thereof are perpendicular, an X-configuration thereby being defined as seen in cross-section.

In use, the guard 60 illustrated in Fig. 8 is placed over a painted stripe or marking that has been freshly applied to a road, so that the foot portions 76 straddle the stripe, thereby forming a guard therefor for preventing passing vehicles from contacting the freshly applied painted marking.

Referring now to Fig. 9, a further modified form of the guard is illustrated, and is generally indicated at 80. The guard 80 includes a pair of sections, only one of which is shown. It is understood that the corresponding section is identical to the section 82 shown and described hereinbelow. The section 82 is formed with a plurality of holes 84 of various sizes, the holes 84 being adapted to provide means for resisting wind currents and for decreasing the weight of the guard. The section 82 is similar to the sections described above in connection with Figs. 1–7 in that a slot 86 is formed therein adjacent a lateral edge thereof and a groove 88 is formed in the opposite lateral edge. The slot 86 is closed by tongues 90 which meet at the slit line 92, the tongues being adapted to be received by a groove similar to groove 88 formed in the corresponding section. The groove 88 also receives the locking tongues of the corresponding section, the two sections thereby being locked together. It is also contemplated to apply an adhesive binding agent to the two sections to permanently secure them in the assembled position. It is understood that when the adhesive is utilized disassembling for storing or shipping is not practical. Formed on the extreme ends of the longitudinal edges of the section 82 are foot portions 94 which are adapted to contact the surface of the road or highway. It is seen that after the section 82 and the similarly formed section are assembled, the guard 80 is placed over a paint marking freshly applied to a road or highway, the foot portions straddling the marking, thereby preventing passing vehicles from marring or blemishing the marking.

Referring now to Figs. 10–12, a further modified form of the present invention is illustrated and comprises a one-piece guard generally indicated at 96. The guard 96 is molded in a one-piece construction and comprises a plurality of fins or longitudinally extending members 98 which are integrally formed meeting at a center portion 100, thereby defining an X-configuration as seen in section (Figs. 11, 12).

Formed integral with the longitudinal edge of each fin 98 is a foot portion 102 that is adapted to contact the surface of a road or highway thereby elevating the longitudinal edges of the fins and preventing contact thereof with a freshly applied paint stripe. The one-piece guard 96 is utilized in the manner described above and is adapted to be placed over a road marking 104 (Fig. 12) so that the foot portions 102 straddle the marking. The road guard 96 may be placed over the road marking 104 in any manner, so long as any two of the fins 98 straddle the marking. Thus, it is seen that the road guard 98 may be easily and quickly placed in position without due regard to a particular location of a single fin. The foot portions 102 serve to elevate the edges of the fins above the road marking and thereby prevent blemishing or marring of the marking when the guard is located thereover. The road guard 96 is easily manufactured in a simple molding process and is formed of a flexible material, such as rubber or plastic, thereby rendering the guard resistant to wear due to weather and traffic. It is also seen that the guard may be painted to simulate brick or a metal material and will thereby cause motorists to be cautious and to drive clear of the newly applied road marking.

It will be obvious to those skilled in the art that various changes may be made without departing from the spirit of the invention and therefore the invention is not limited to what is shown in the drawings and described in the specification but only as indicated in the appended claims.

What is claimed is:

1. In a guard for highway markings, a body formed of a resilient material, said body being defined by longitudinally extending members, said members forming an X configuration in cross section, each of said members being formed with locking means, each of said locking means engaging the other of said members for securing said members together, each of said members having a foot portion formed on the extreme ends thereof, said foot portions acting to elevate the longitudinal edges of the members disposed over the highway marking.

2. In a guard for highway markings, a body comprising a plurality of sections, each of said sections including a locking tongue and groove, each of said tongues being received by the groove in the opposite section for locking said sections together, said sections forming an X configuration as seen in section and being formed with foot portions on the extreme ends thereof, the longitudinal edge of each section being adapted to be placed over a freshly applied marking, said foot portions elevating said edges to prevent contact thereof with said marking.

3. In a guard for highway markings, a pair of substantially flat sections, each of said sections being formed with a longitudinally extending slot adjacent one edge thereof and a groove in the opposite edge thereof, said slot being closed by a pair of coacting tongues, said tongues defining locking members, said sections being assembled so that the slots formed therein slidably engage the body of the opposite section, said locking members of each section extending into the groove of the opposite section thereby locking said sections together to form an X configuration when seen in section.

4. In a guard for highway markings as set forth in claim 3 wherein said sections have foot portions formed on the extreme ends thereof, said foot portions being adapted to elevate the longitudinal edges of said sections for preventing contact thereof with a surface when said guard is placed on said surface over a freshly applied marking.

5. A guard for a highway marking as set forth in claim 2 wherein said sections are formed with openings therein, said openings providing for increasing the resistance of said guard to wind generated by passing traffic when said guard is placed over said marking.

6. A guard for a highway marking comprising a body formed of a flexible material molded in a one-piece construction, said body including a plurality of faces that define an X-configuration when viewed in section, the longitudinal edges of said faces being adapted to be placed over said marking to protect said marking from passing traffic, said longitudinal edges of said faces being formed with foot portions, said foot portions being adapted to elevate said longitudinal edges out of contact with said marking when said guard is placed thereover.

References Cited in the file of this patent

UNITED STATES PATENTS

| 1,943,295 | Block | Jan. 16, 1934 |
| 2,238,683 | Elliott | Apr. 15, 1941 |
| 2,712,809 | Clarke | July 12, 1955 |

FOREIGN PATENTS

| 581,483 | Germany | July 28, 1933 |